US006754168B2

(12) United States Patent
Hashimoto

(10) Patent No.: US 6,754,168 B2
(45) Date of Patent: Jun. 22, 2004

(54) DISC CARTRIDGE WITH INNER CASE

(75) Inventor: Gakuji Hashimoto, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/134,394

(22) Filed: Apr. 30, 2002

(65) Prior Publication Data

US 2002/0122380 A1 Sep. 5, 2002

Related U.S. Application Data

(62) Division of application No. 09/376,434, filed on Aug. 18, 1999, now Pat. No. 6,487,166.

(30) Foreign Application Priority Data

Aug. 24, 1998 (JP) .......................................... P10-237444

(51) Int. Cl.[7] .............................. G11B 3/70; G11B 5/84; G11B 7/26
(52) U.S. Cl. ...................................................... 369/291
(58) Field of Search ................................ 369/291, 289, 369/272; 360/133

(56) References Cited

U.S. PATENT DOCUMENTS

| 4,652,961 A | | 3/1987 | Dieffenbach ................. 360/133 |
| 4,724,962 A | | 2/1988 | Watanabe et al. ............ 360/133 |
| 4,853,925 A | * | 8/1989 | Kaneuchi ..................... 369/291 |
| 5,021,913 A | * | 6/1991 | Overland et al. ............ 360/133 |
| 5,278,717 A | | 1/1994 | Sasaki et al. ................. 360/133 |
| 5,381,402 A | | 1/1995 | Lee et al. ..................... 369/291 |
| 5,481,420 A | | 1/1996 | Cardona et al. ........... 360/99.06 |
| 5,537,389 A | * | 7/1996 | Kuwa et al. .................. 369/291 |
| 5,995,346 A | * | 11/1999 | Schick et al. ................ 360/133 |

FOREIGN PATENT DOCUMENTS

| EP | 0 077 566 | 4/1983 |
| EP | 0 428 207 A2 | 5/1991 |
| EP | 0 933 7 22 A2 | 8/1999 |
| GB | 2 081 956 A | 7/1981 |
| GB | 2 228 818 A | 9/1990 |
| WO | 87/03134 | 5/1987 |

OTHER PUBLICATIONS

Patent Office of the People's Republic of China, China Patent Agent (H.K.) Ltd., First Office Action, Date of Issue: Mar. 28, 2003, Patent Application No.: 99121645.8, Title: "Disc Cartridge", Application Date: Aug. 24, 1999.

* cited by examiner

Primary Examiner—Julie Anne Watko
(74) Attorney, Agent, or Firm—Rader, Fishman & Grauer PLLC; Ronald P. Kananen

(57) ABSTRACT

There is disclosed a disc cartridge comprising an optical disc (13), first and second halves (15), (16) and a slide shutter (14), in which the slide shutter (14) is removably supported between the first and second halves (15) and (16), whereby it is possible to prevent erroneous opening and closing operations by making it difficult for a user's hand to touch as well as to prevent a loss of an information record by such an arrangement which is difficult for minute trash and dust to intrude.

22 Claims, 16 Drawing Sheets

F I G. 9A
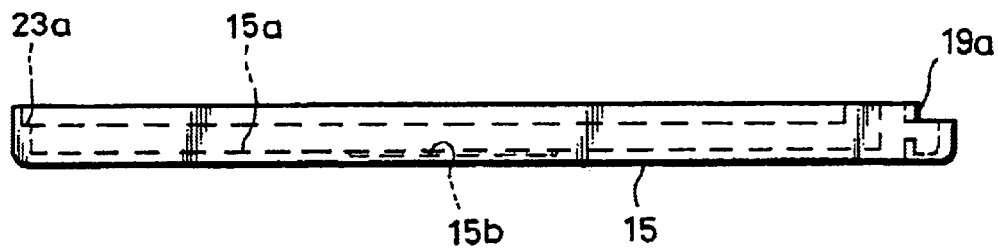
F I G. 9B
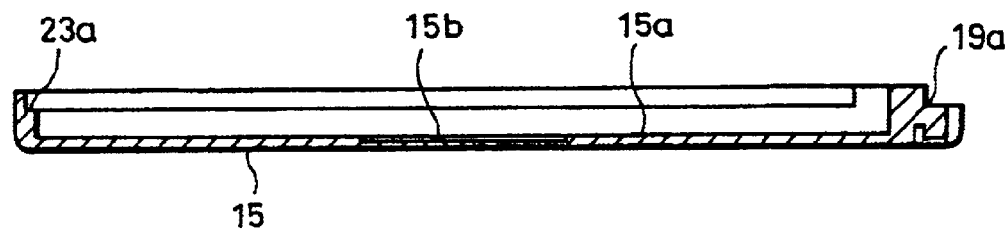
F I G. 9C
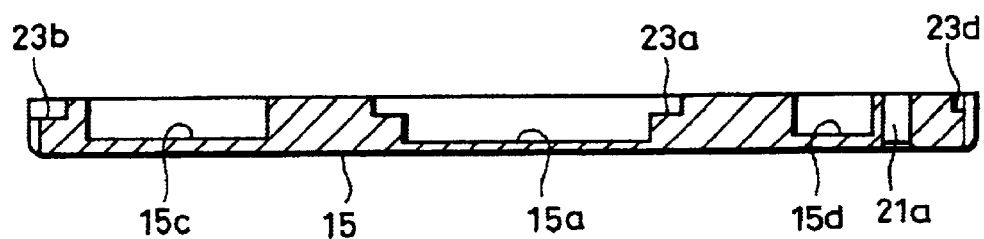
F I G. 9D
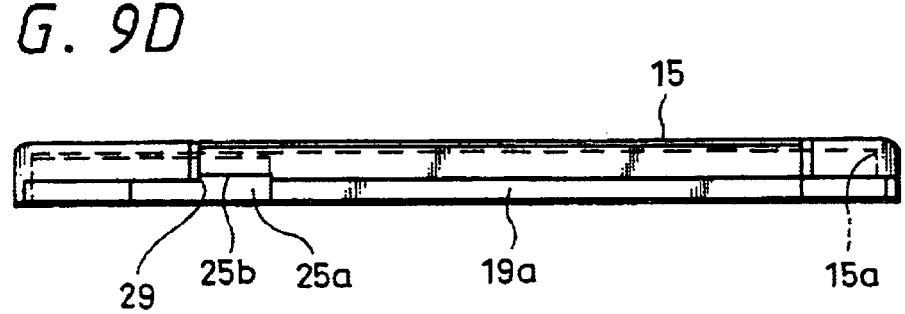

DISC CARTRIDGE WITH INNER CASE

This application is a divisional application of Ser. No. 09/376,434, filed on Aug. 18, 1999, now U.S. Pat No. 6,487,166.

BACKGROUND OF THE INVENTION

1. Field of the Invention

The present invention relates to a disc cartridge which rotatably accommodates in a cartridge housing a disc-shaped storage media such as an optical disc, a magnetic disc, a magneto-optical disc and the like capable of recording (writing) and/or reproducing (reading) an information signal such as audio information, video information or computer data information and the like.

2. Description of the Related Art

In recent years, as a disc cartridge which rotatably accommodates in a disc cartridge housing a disc-shaped storage medium such as a magneto-optical disc or the like, for example, what is shown in FIG. 16 has been generally known. A cartridge disc 1 is one so called an MD (mini-disc) with a disc-shaped storage medium of 64 mm in diameter being built therein. Of the MD1, there are a reproduction-only MD and a recording and/or reproducing MD. The recording and/or reproducing MD is comprised of a cartridge housing 2 and a magneto-optical disc 3 while the reproducing-only MD is comprised of a cartridge housing and an optical disc.

FIG. 16 is a perspective view of the MD1 seen from a reverse side and the cartridge housing 2 thereof comprises upper and lower halves 2a and 2b which are superposed each other and the magneto-optical disc 3 is rotatably accommodated in a disk accommodation room which is formed in both the upper and lower halves 2a and 2b. The upper and lower halves 2a and 2b are made square shaped when seen from the front and nearly at the central portion of its one side are respectively provided opening windows 4 penetrating in an up to down direction. These opening windows 4 are extended to nearly a central portion of the cartridge housing 2 and are made capable of being opened and closed by a slide shutter 5.

The slide shutter 5, having a cross-sectionally U-letter shape, comprises an upper shutter tab 5a for closing the opening window 4 provided in the upper half 2a, a lower shutter piece for closing the opening window provided in the lower half 2b and a side piece 5b for connecting both the shutter pieces. Then, the cartridge housing 2 is provided with a lock mechanism for locking the slide shutter 5 when the opening window 4 is in a state of being closed. Also, nearly at a central portion of the lower half 2b is provided a central hole 6 for exposing a hub plate 3a of the magneto-optical disk 3, with the central hole 6 being always opened.

The MD1 having such an arrangement is, with the lower half 2b in a state of facing downward, inserted into a cartridge inserting mouth of a disc recording and/or reproducing apparatus from an arrow mark direction X. Consequently, the locking by the rock mechanism is released by a manipulating pin provided in the disc recording and/or reproducing apparatus and the manipulating pin as it is, slides the slide shutter 5 in an opposite direction to the arrow mark direction X. As a result, the opening windows 4 are opened, thereby making it possible to insert an optical head of an optical pick-up device in the opening windows 4.

However, since the conventional disc cartridge has been constituted such that the cross-section U-letter shaped slide shutter fits in the outside of the cartridge housing as well as the shutter piece 5a are respectively slid on the outsides of the upper and lower halves 2a and 2b to open and close the opening windows 4, clearances tend to be easily in place due to curling of the free end side of the shutter pieces 5a, thereby incurring a problem that minute trash and dust tend to easily enter into the cartridge housing 2 from the clearances. In this case, with an information storage medium with a large information capacity, the influence of the minute trash and the dust can not be negligible and when it is impossible to prevent the intrusion of the minute trash or the dust, there is a fear that the information storage surface of the disc-shaped storage medium is damaged by the minute trash or the dust. When the information storage surface is damaged, it becomes impossible to read and write a normal information signal.

With the conventional disc cartridge, since the slide shutter 5 is in place which is easily touched by the hand of a user, there is a fear that the user accidentally opens the slide shutter 5. When the user accidentally opens the slide shutter 5 in this manner, the influence of the trash and dust becomes increasingly larger with the higher density of the information record and hence, there have been problems that a loss of and the damage to an information record are feared to occur by the existence of the trash and dust.

SUMMARY OF THE INVENTION

The present invention is implemented in view of such conventional problems and its object is to provide a disc cartridge which has such an arrangement to prevent erroneous opening and closing operations by making it difficult for the hand of a user to touch it as well as for minute trash and dust to intrude therein, thereby making it possible to avoid the loss of the information record caused by the minute trash and dust.

According to a first aspect of the present invention, there is provided a disc cartridge for accommodating a disc-shaped storage medium in which at least one of recording or reproducing of an information signal is carried out by a head unit of a pick-up device, which comprises a pair of halves superposed upon each other for forming a disc accommodation room for rotatably accommodating the disc-shaped storage medium, and a shutter member capable of opening and closing an opening window which is provided in at least one half out of a pair of the halves and into which a head unit can be inserted, wherein the shutter member is movably supported between the pair of the halves.

According to a second aspect of the present invention, there is provided a disc cartridge, wherein a shutter supporting body for supporting a free end side of the shutter member is provided between the pair of halves.

According to a third aspect of the present invention, there is provided a disc cartridge, wherein the shutter supporting body is an inner case which forms a disc accommodation room between the same and the half without the opening window, and the inner case is provided with an opening portion corresponding to the opening window of the half having the opening window.

According to a fourth aspect of the present invention, there is provided a disc cartridge, wherein the shutter member is provided with an overlapping portion which is overlapped on a peripheral portion of at least one of the opening window or opening portion.

According to a fifth aspect of the present invention, there is provided a disc cartridge, wherein the shutter member is provided with a convex portion which comes in contact with either one of the shutter supporting body or the half with the opening window as urges the shutter member against the other one of the shutter supporting body or the half with the opening portion by a reaction force from the contact portion.

According to a sixth aspect of the present invention, there is provided a disc cartridge, wherein a lock mechanism for locking the shutter member at a position where the opening window is closed is provided.

In the disc cartridge of the first aspect arranged as mentioned above, since the shutter member is supported between the pair of the halves, the shutter member is made to have such an arrangement which makes it difficult for the hand of a user to touch the shutter member to prevent erroneous opening and closing operations as well as for minute trash and dust to intrude so that a loss of information records due to the minute trash and dust can be prevented.

In the disc cartridge of the second aspect, by supporting a free end side of the shutter member with the shutter supporting body provided in the half with no opening window, the free end side is prevented from flexing and the malfunction of the shutter member to come in touch with the disc-shaped storage medium can be avoided.

In the disc cartridge of the third aspect, the half with no opening window and the inner case form a sealed disc accommodation room to prevent the trash and dust from intruding and the head unit can be brought to nearly the disc-shaped storage medium by the opening portion of the inner case.

In the disc cartridge of the fourth aspect, by shielding a clearance along the whole periphery of the opening window with an overlapping portion of the shutter member, the trash and dust can be prevented from intruding into a cartridge housing as well as the disc-shaped storage medium can be prevented from being attached with the trash and the like as well as being damaged by the trash and the like.

In the disc cartridge of the fifth aspect, by pressing the shutter member with the convex portion provided in the shutter member against the opening window or the opening portion, the clearance into which the trash and dust intrude is made smaller, thereby making it possible to prevent the disc-shaped storage medium from being attached with the trash and the like as well as from being damaged by the trash and the like.

Also, in the disc cartridge of the sixth aspect, by locking the shutter member at a position where the opening window is closed, the shutter member can be prevented from being freely opened as well as from erroneous operations of opening and closing.

BRIEF DESCRIPTION OF THE DRAWINGS

FIGS. 9A–D shows the upper half concerning the disc cartridge shown in FIG. 1, in which FIG. 9A is a side view, FIG. 9B is a cross-section view taken on E—E line of FIG. 8, FIG. 9C is a cross-section view taken of D—D line of FIG. 8 and FIG. 9D is a rear view;

FIGS. 11A–D shows the lower half concerning the disc cartridge shown in FIG. 1, in which FIG. 11A is a side view, FIG. 11B is a cross-section view taken on E—E line of FIG. 10, FIG. 11C is a cross-section view taken on F—F line of FIG. 10 and FIG. 11D is a rear view;

FIGS. 12A–B shows an inner case concerning the disc cartridge shown in FIG. 1, in which FIG. 12A is a plan view and FIG. 12B is a cross-section view taken on G—G line of FIG. 12A;

FIGS. 13A–C shows a slide member concerning the disc cartridge shown in FIG. 1, in which FIG. 13A is a front view, FIG. 13B is a side view and FIG. 13C is a plan view;

FIGS. 14A–B shows a lock member concerning the disc cartridge shown in FIG. 1, in which FIG. 14A is a front view and FIG. 14B is a side view;

DESCRIPTION OF THE PREFERRED EMBODIMENTS

Figure 1:
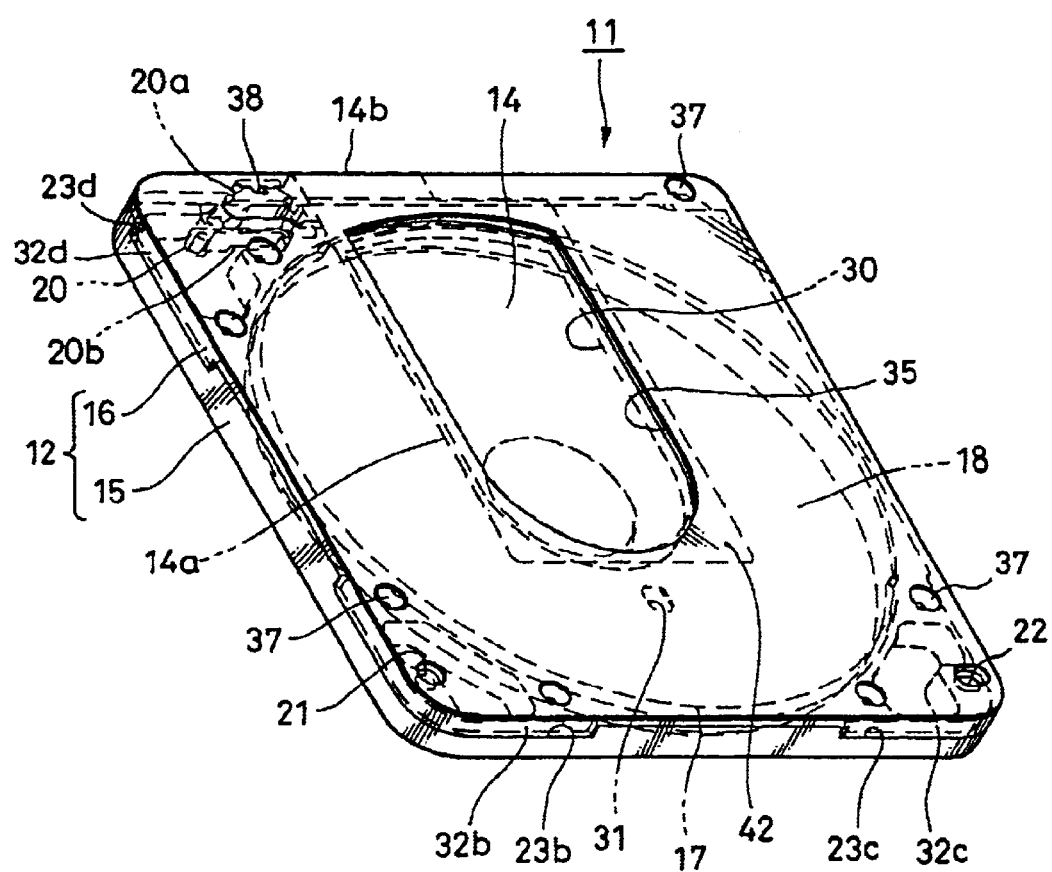
FIG. 1 shows a first embodiment of a disc cartridge of the present invention and is a perspective view thereof with an opening window being closed by a shutter member.
Figure 2:
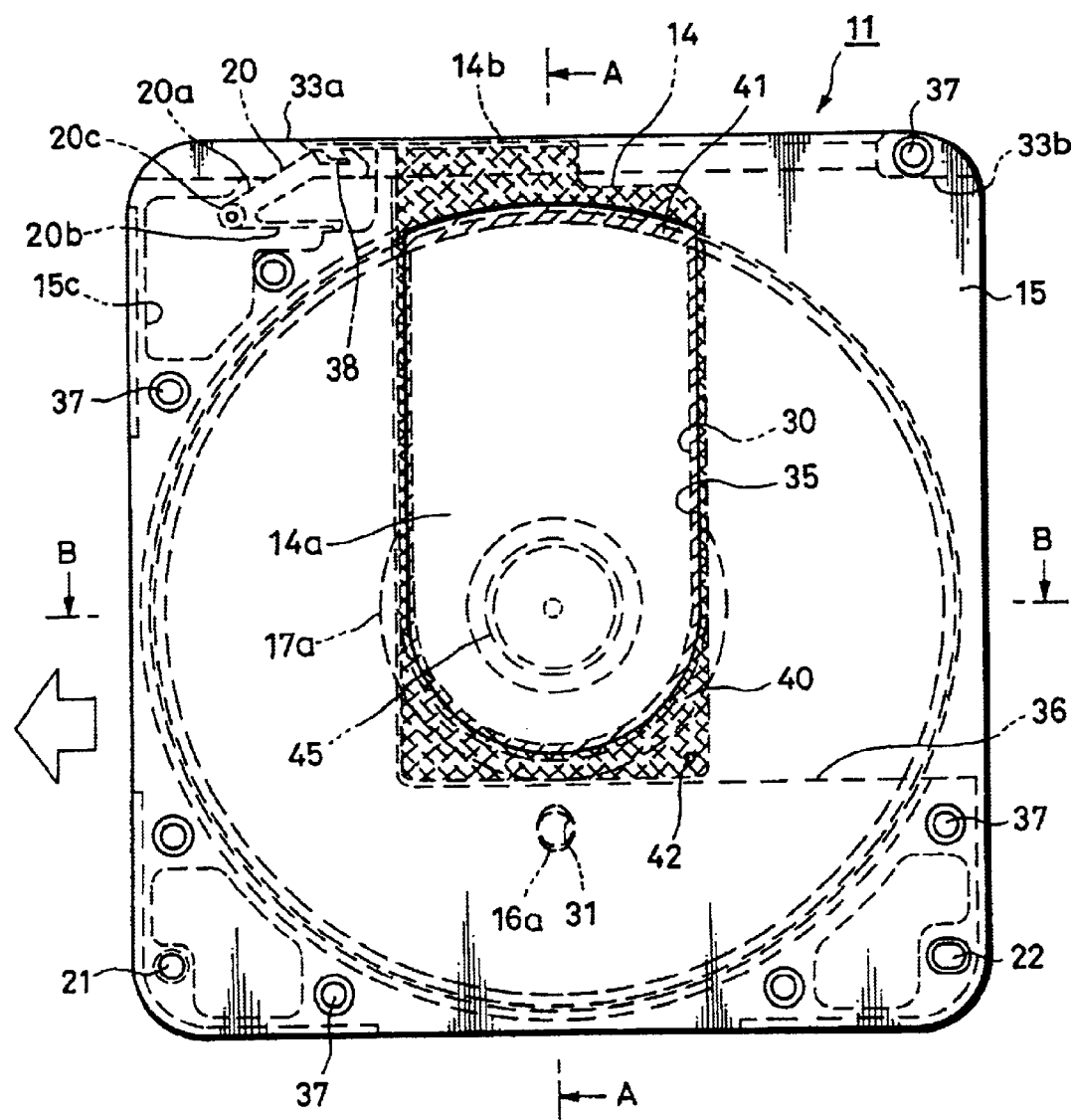
FIG. 2 is a plan view of the disc cartridge shown in FIG. 1 with its opening window being closed by the shutter member.
Figure 3:
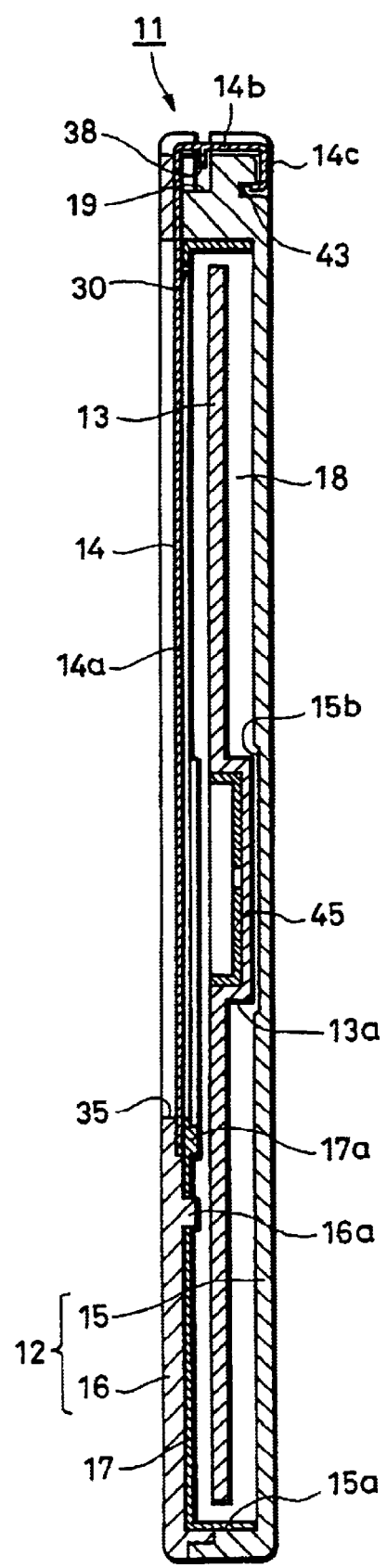
FIG. 3 is a cross-section view taken on A—A line of the disc cartridge shown in FIG. 2.
Figure 4:
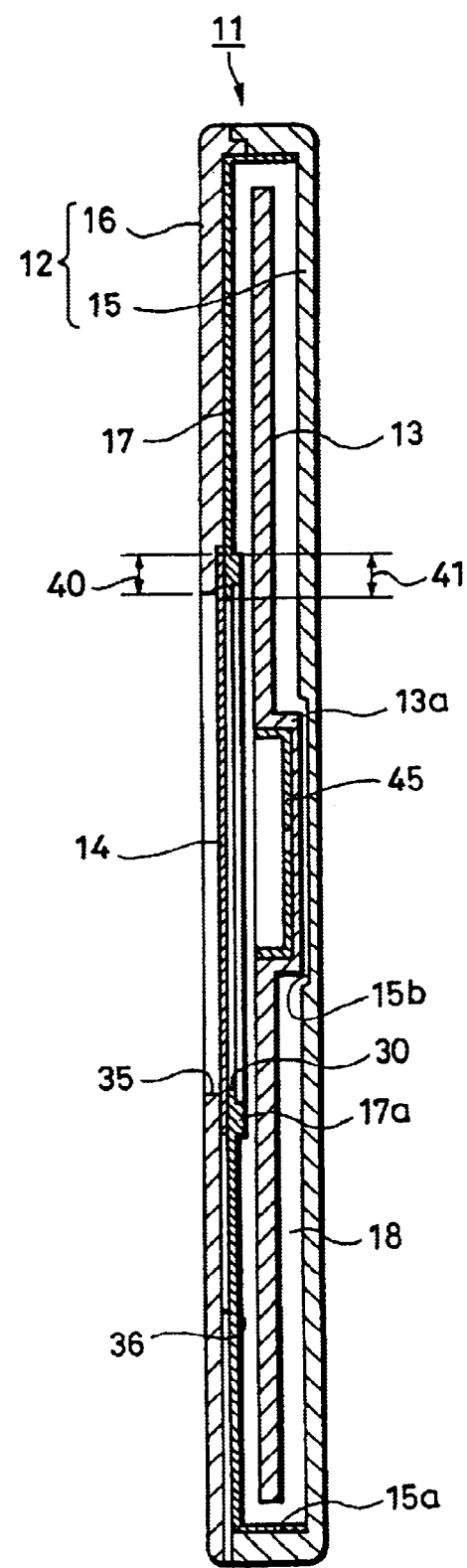
FIG. 4 is a cross-section view taken on B—B line of the disc cartridge shown in FIG. 2.
Figure 5:
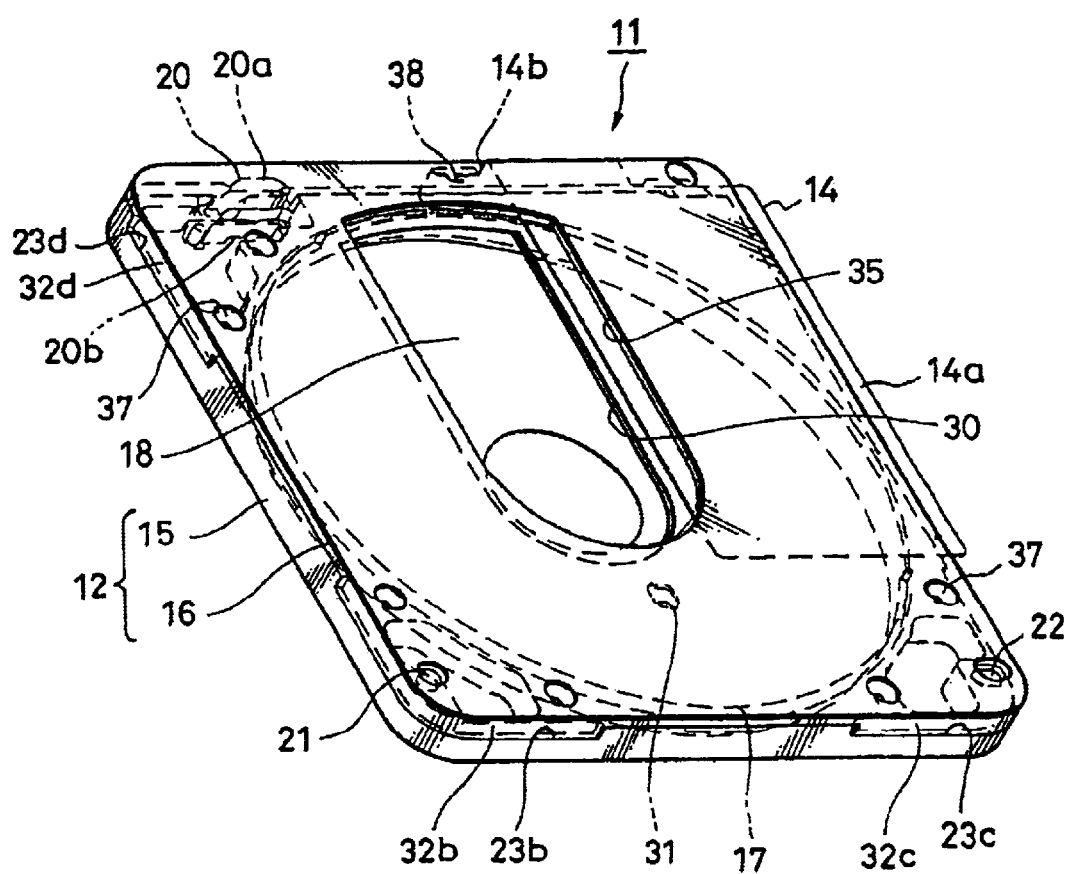
FIG. 5 is a perspective view of the disc cartridge shown in FIG. 1 with the opening window being opened.
Figure 6:
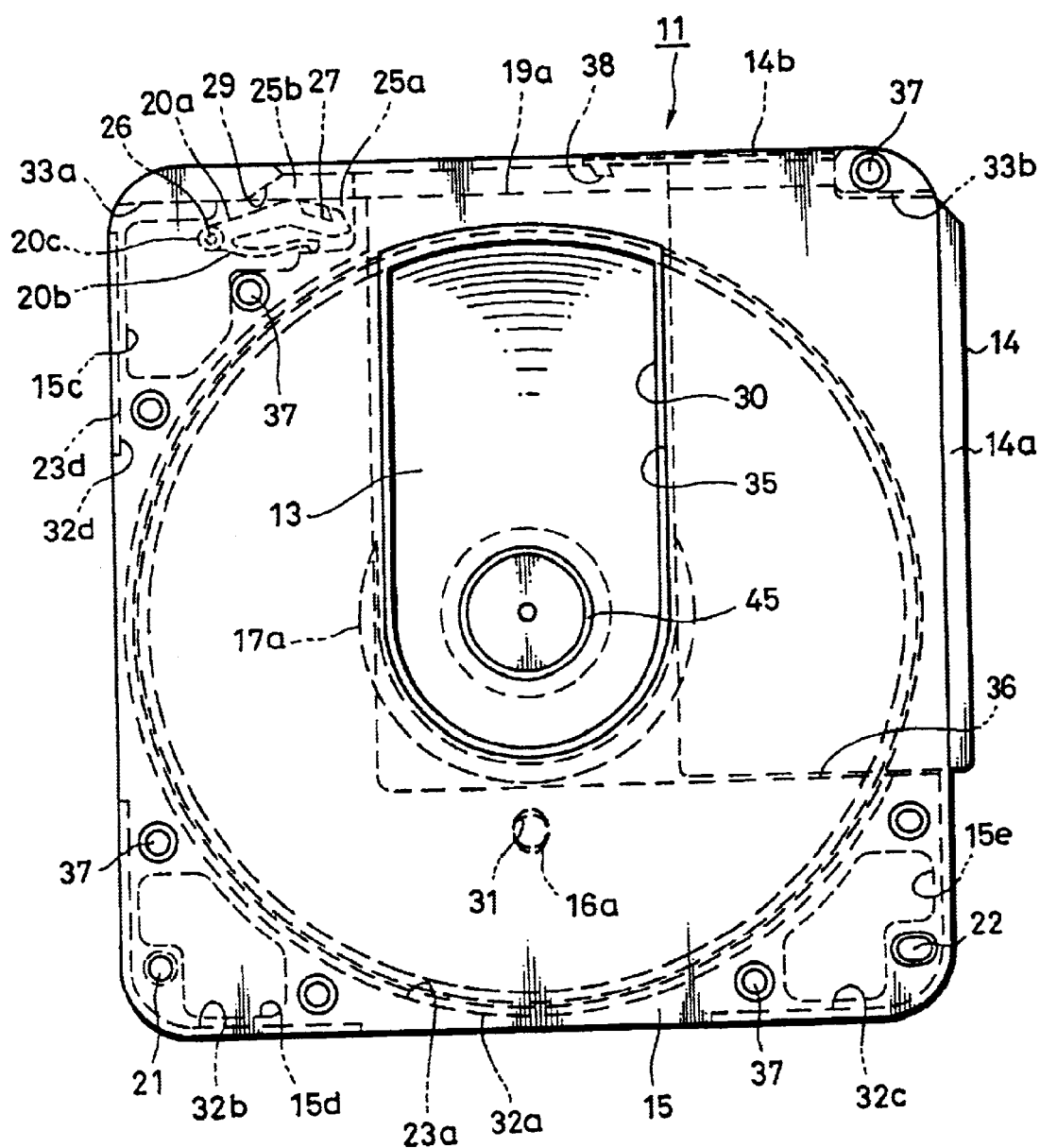
FIG. 6 is a plan view of the disc cartridge shown in FIG. 1 with the opening window being opened.
Figure 7:
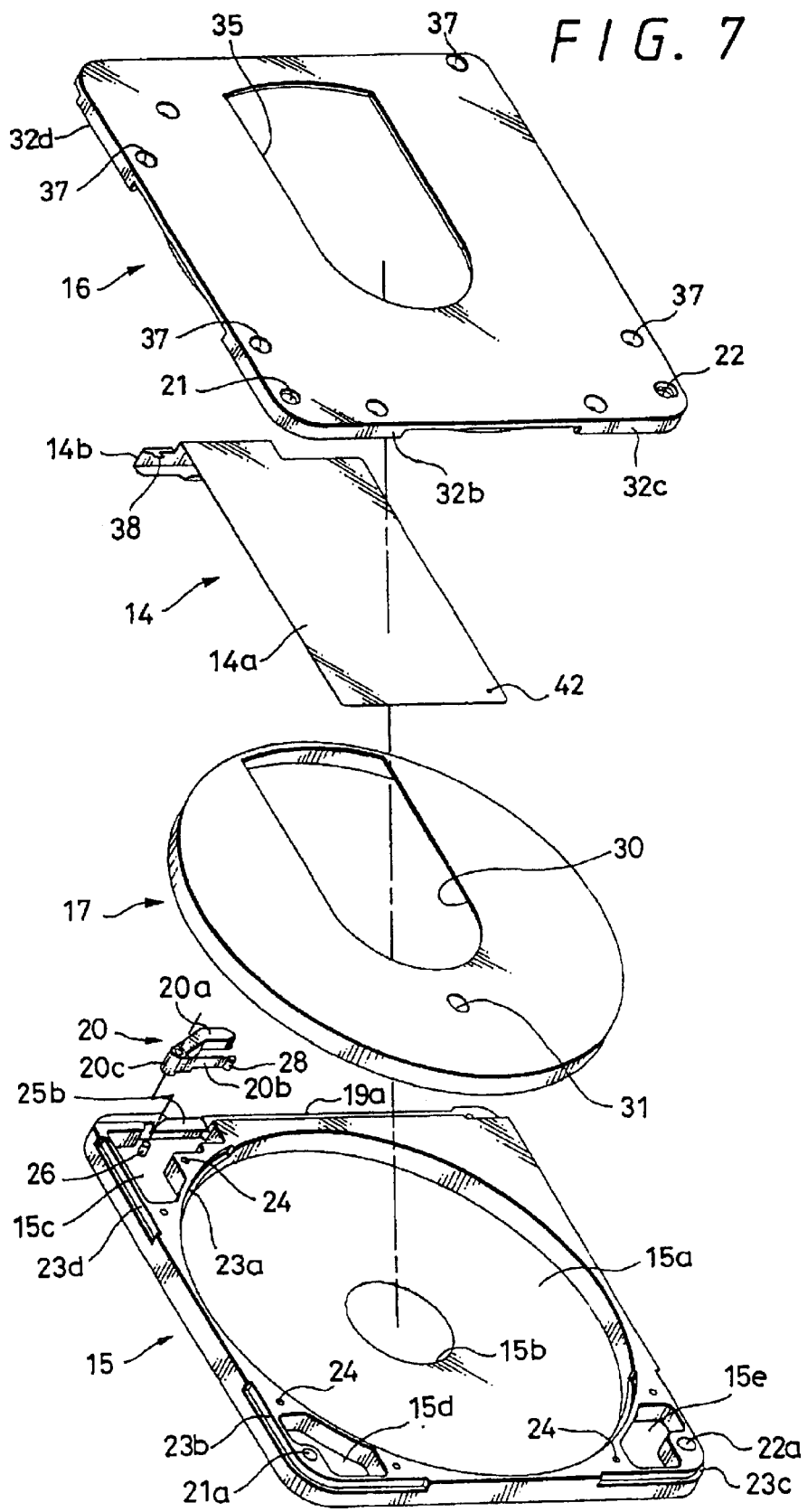
FIGS. 7A–D is an exploded perspective view of the disc cartridge shown in FIG. 1.
Figure 8:
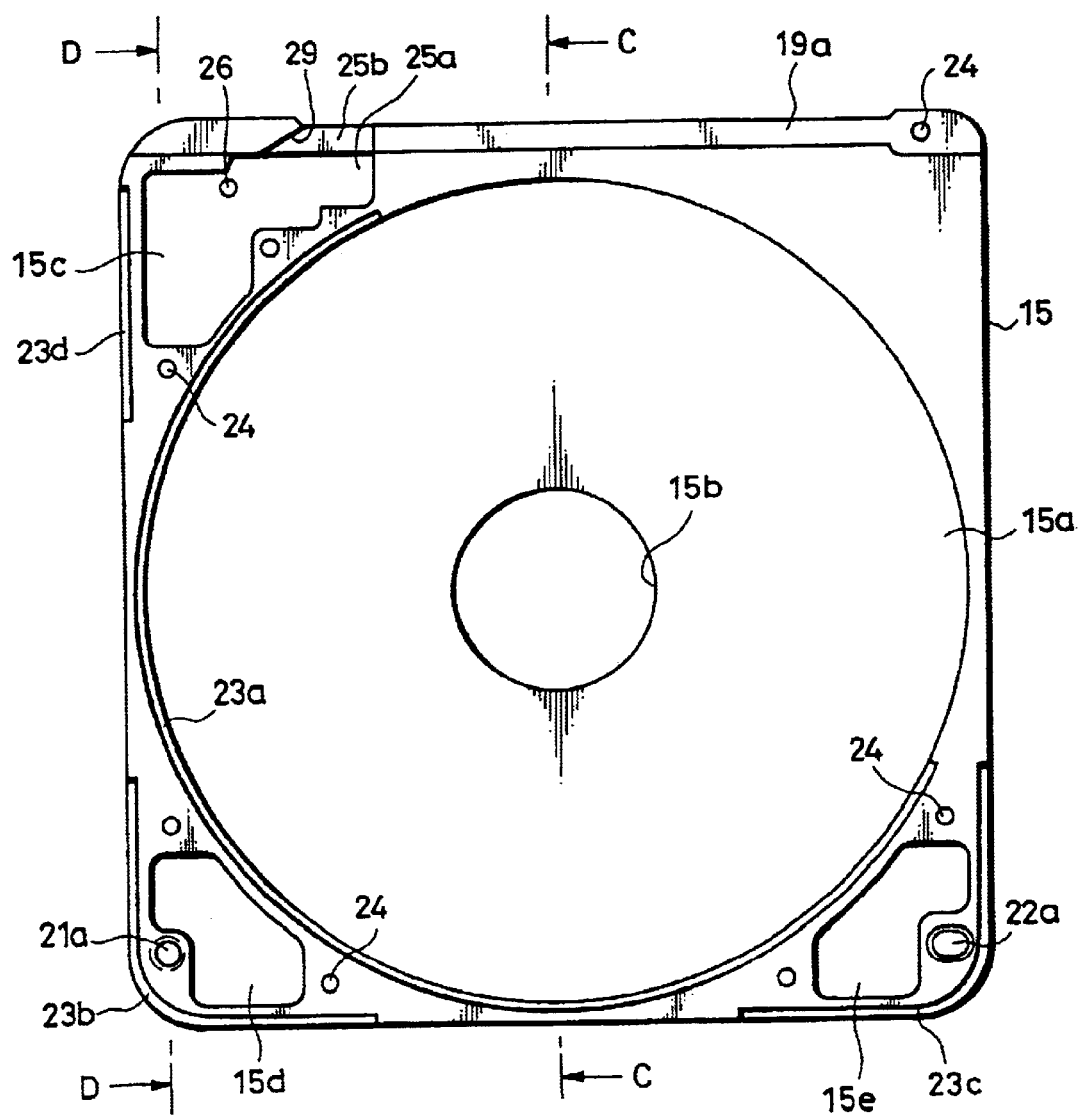
FIG. 8 is a plan view of an upper half concerning the disc cartridge shown in FIG. 1.
Figure 10:
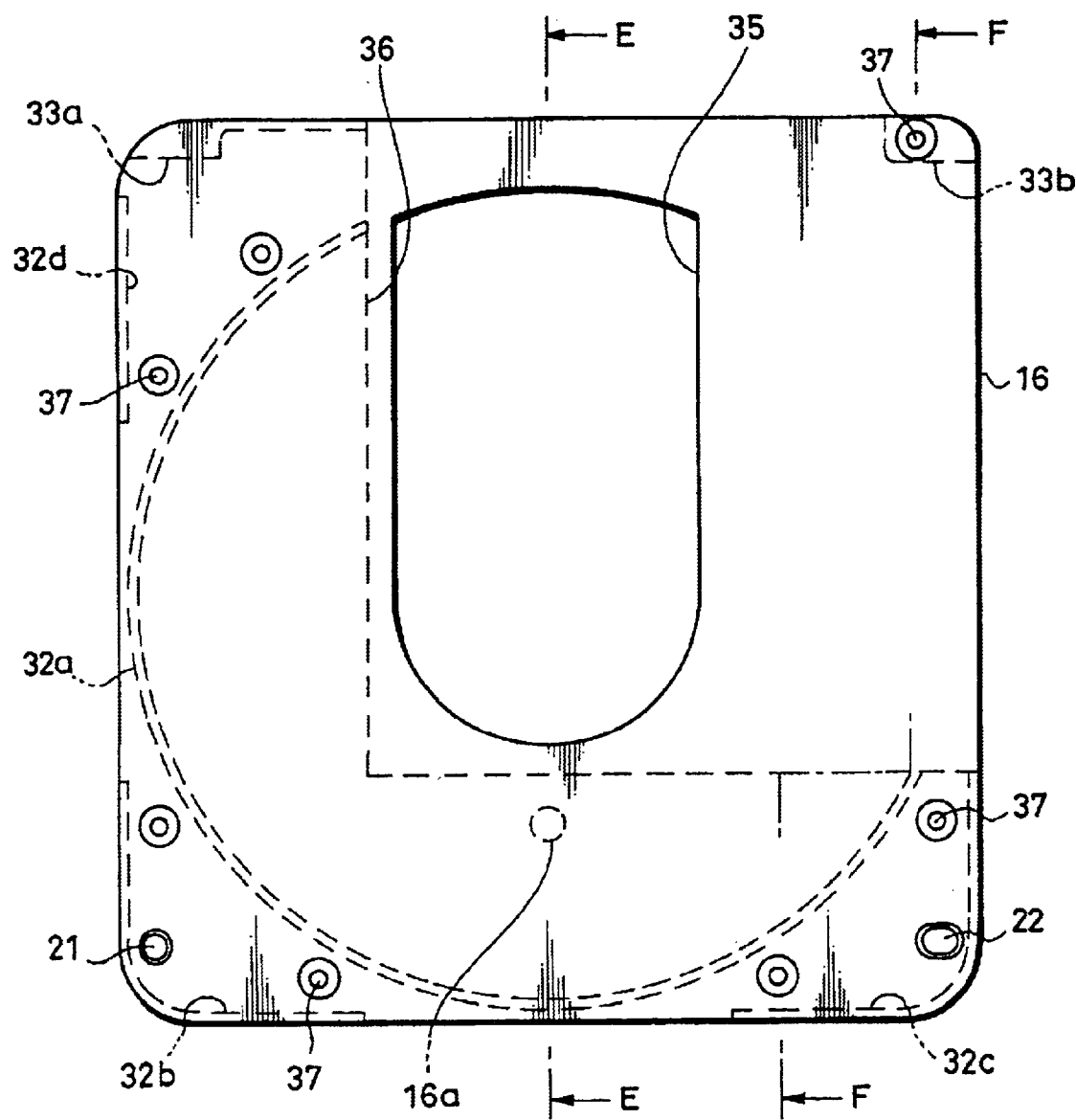
FIG. 10 is a plan view of a lower half pertaining to the disc cartridge shown in FIG. 1.
Figure 11A:
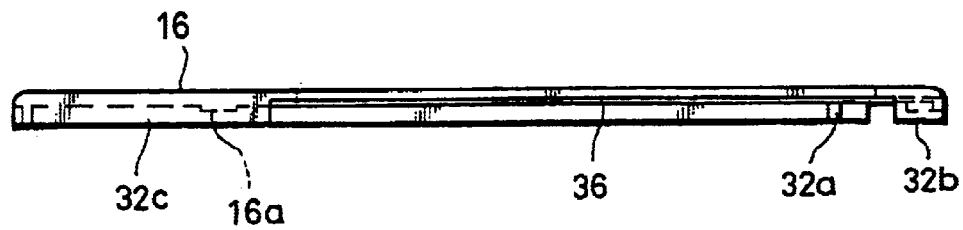
Figure 11B:
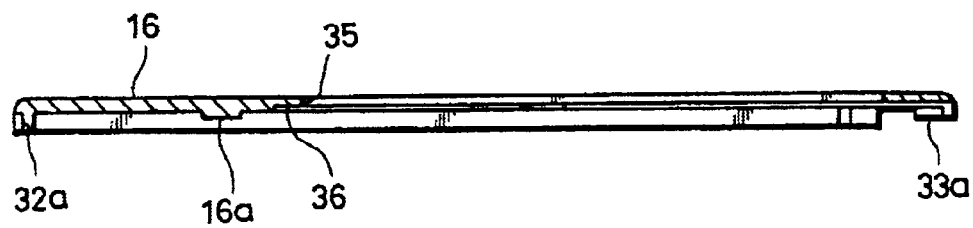
Figure 11C:
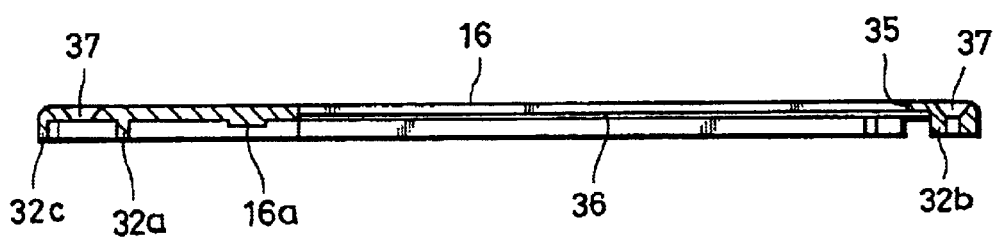
Figure 11D:
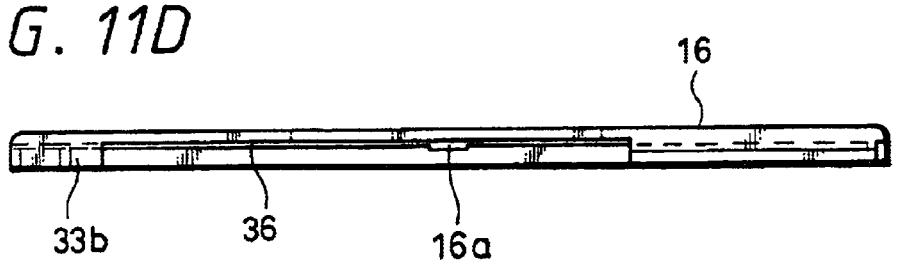
Figure 12A:
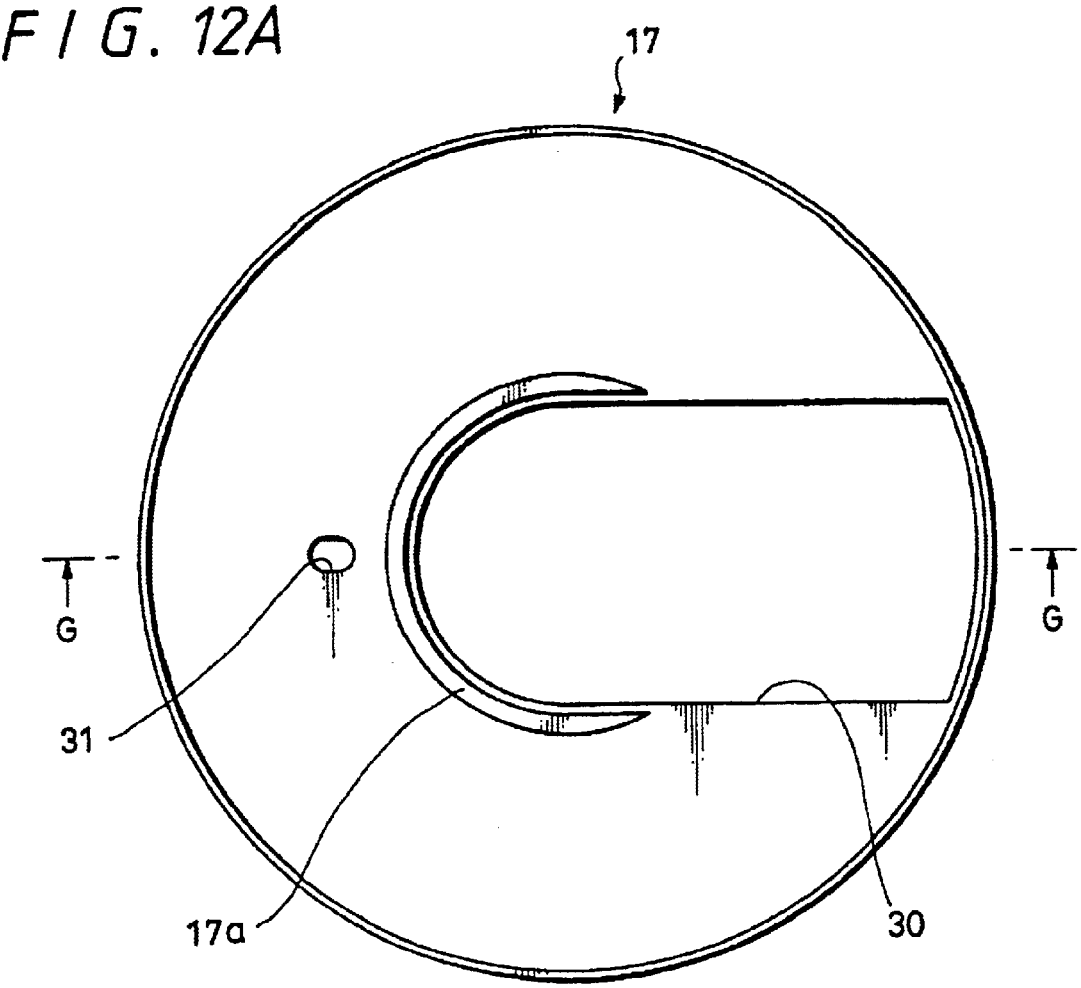
Figure 12B:
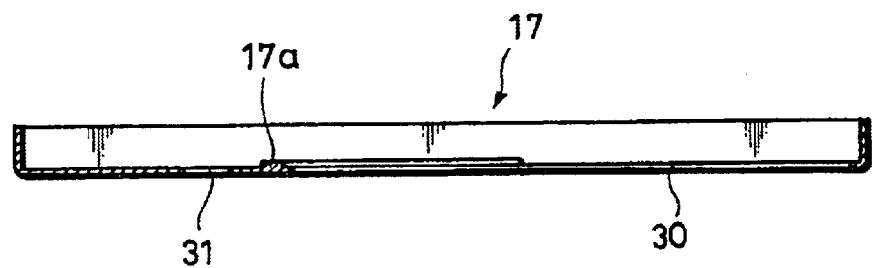
Figure 13C:
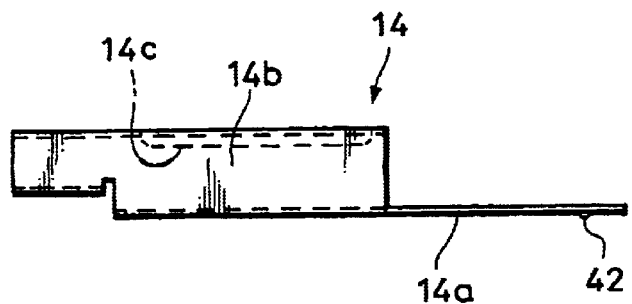
Figure 13A:
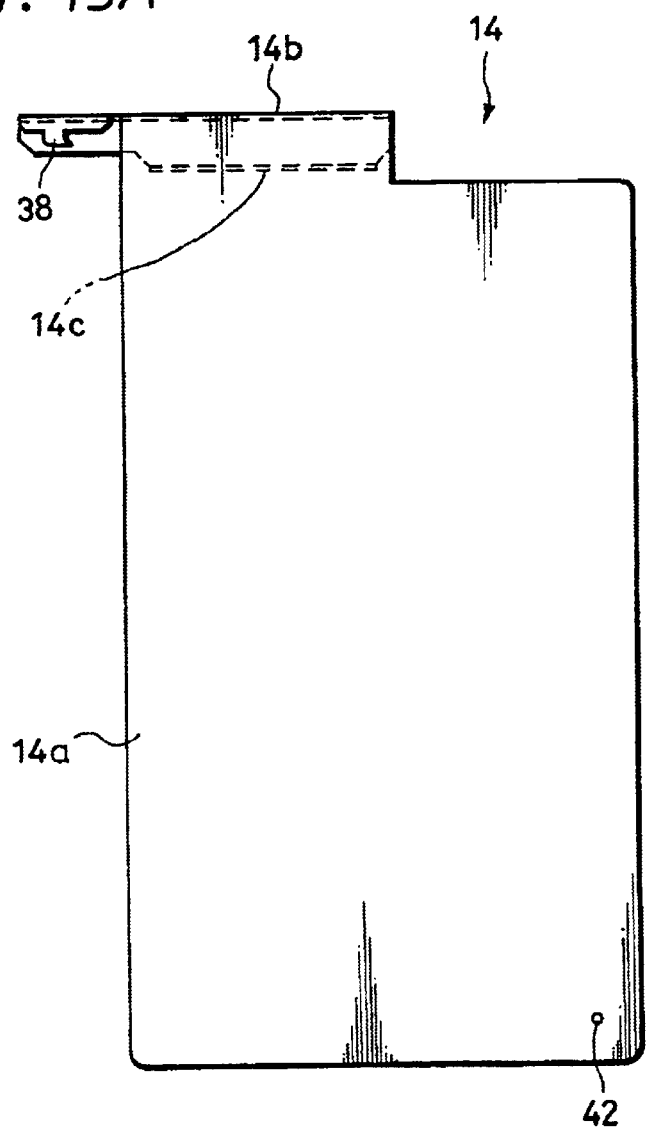
Figure 13B:
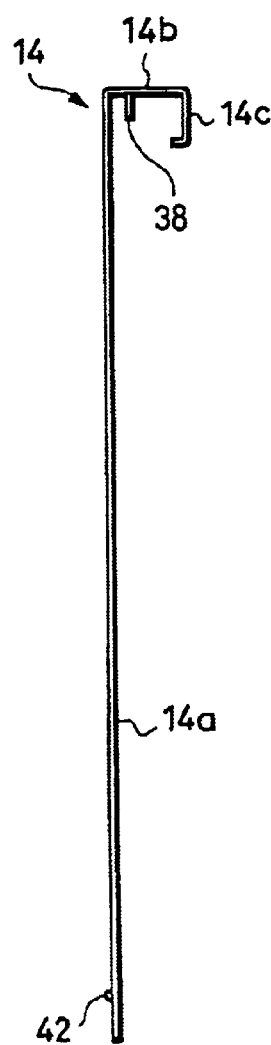
Figure 14A:
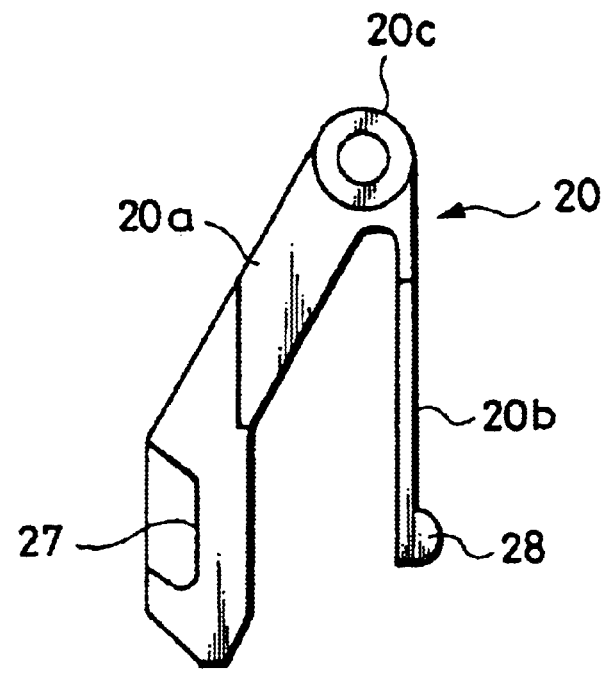
Figure 14B:
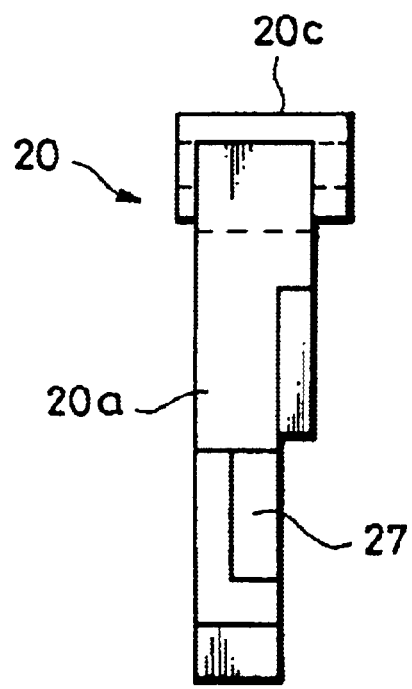
Figure 15:
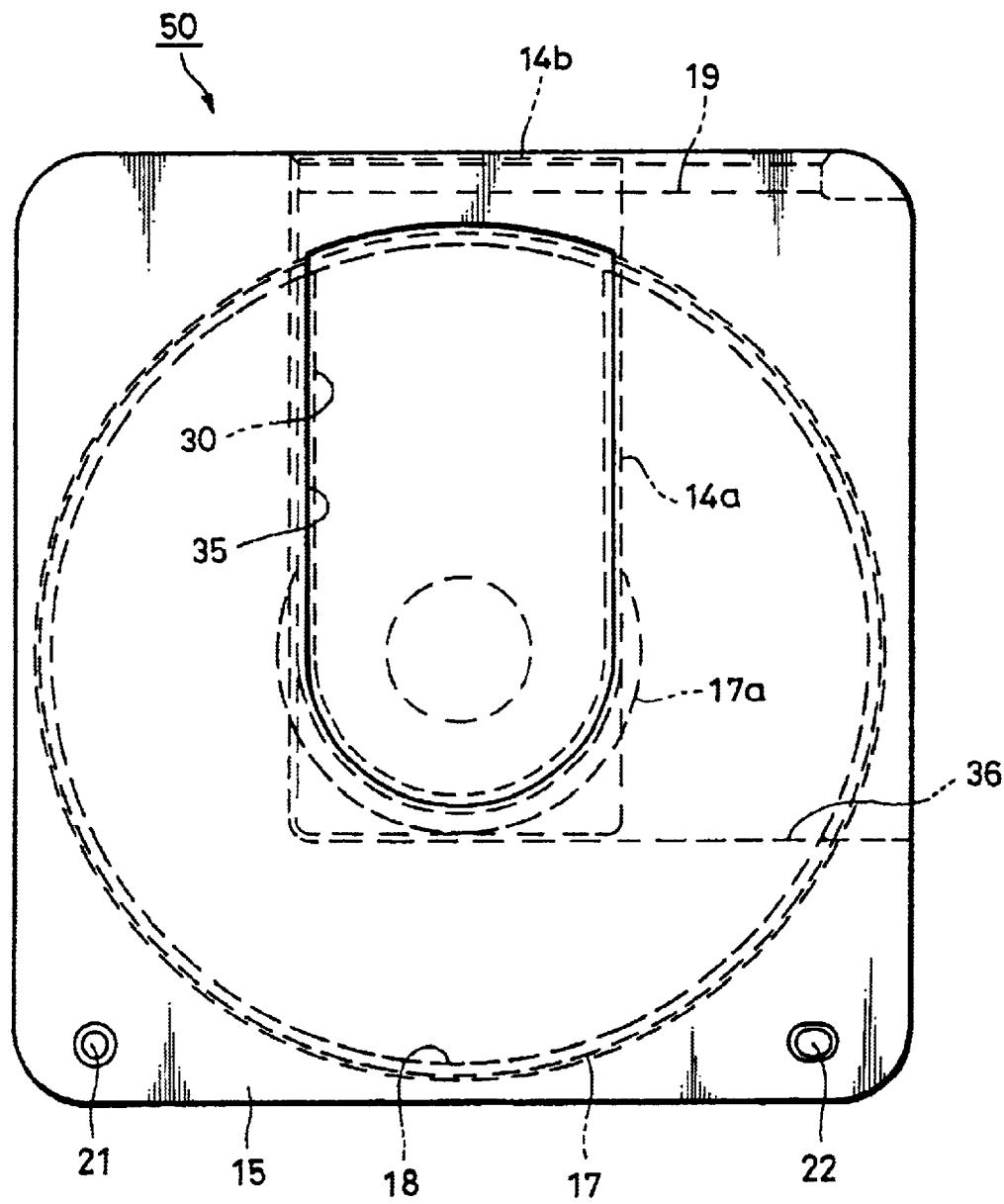
FIG. 15 shows a second embodiment of the disc cartridge of the present invention and is a plan view thereof with an opening window in a state of being closed by the shutter member.
Figure 16:
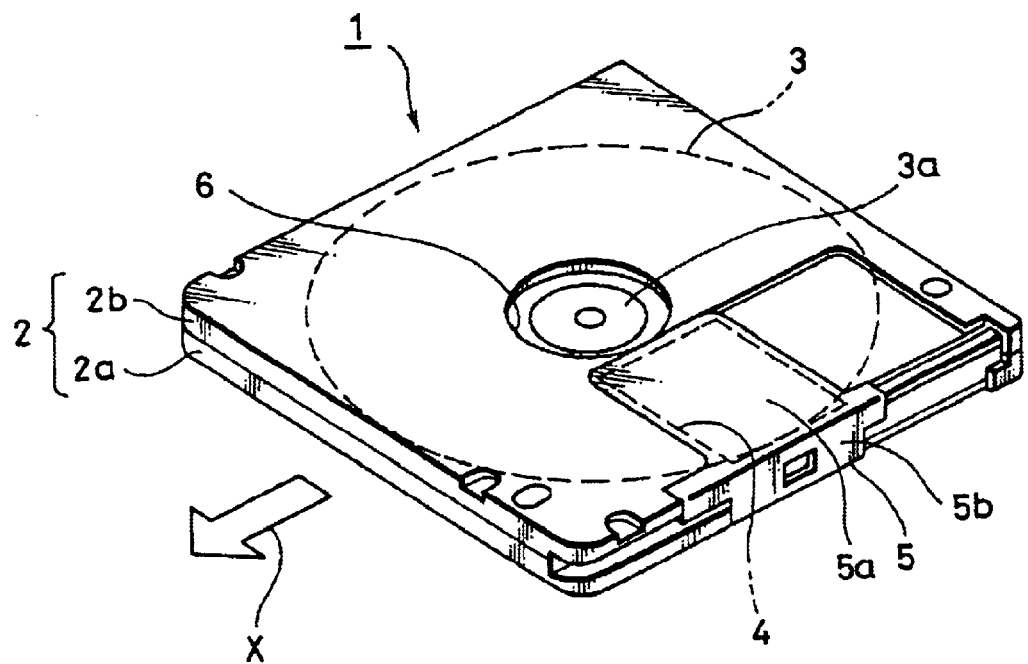
FIG. 16 is a perspective view showing a conventional disc cartridge seen from a rear side.

Hereafter, an embodiment of the present invention will be explained with reference to the attached drawings. FIG. 1 to FIGS. 14A–B show a first the embodiment of a disc cartridge according to the present invention. FIG. 1 is a perspective view showing an opening window in a state of being closed by a shutter member, FIG. 2 is a plan view of the same, FIG. 3 is a cross-section view on line A—A of FIG. 2, FIG. 4 is a cross-section view on line B—B of the same, FIG. 5 is a perspective view showing the opening window in a state of being opened, FIG. 6 is a plan view of the same, FIG. 7 is an exploded perspective view, FIG. 8 is a plan view of a first half, FIGS. 9A to 9D are a side view of the first half, a cross-section view on line C—C, a cross-section view on line D—D and a rear side view, respectively, FIG. 10 is a plan view of a second half, FIGS. 11A to 11D are a side view of the second half, a cross-section view line E—E, a cross-section view on line F—F and a rear side view, respectively, FIGS. 12A and 12B are a plan view and a cross-section view on line G—G of an inner case, respectively, FIGS. 13A to 13C are a front view, a side view and a plan view of a shutter member, respectively, FIGS. 14A to 14B are a side view and a front view of a lock member, respectively. Also, FIG. 15 is a plan view showing a second embodiment of the disc cartridge according to the present invention.

A disc cartridge 11 concerning the embodiment is, as one example of the disc-shaped storage medium, a disc cartridge which enables not only reproducing (read out) but also recording (write in) of an information signal by using a recordable optical disc (for example, rewritable type disc) and is comprised of a cartridge housing 12, an optical disc 13 and a slide shutter 14. However, the disc-shaped storage medium is not limited to this embodiment, but in addition to an optical disc only for reproducing an information signal such as audio, video and the like, a magnetic disc, a magneto-optical disc and other information storage media which are made capable of both the recording and/or reproducing of information signals such as audio, video, data information of a computer and the like can be applied.

As FIG. 1 to FIG. 7 show, the cartridge housing 12 comprises a pair of a first half 15 and a second half 16, a thinner case 17 showing a concrete example of a shutter supporting body accommodated inside both the halves 15, 16 and by superposing both the halves 15 and 16 each other, there is constituted a flat and thin oblong housing which is slightly long in one direction. Inside the first half 15, there is provided a circular shaped cave-in portion 15a, the inner case 17 is fit in the cave-in portion 15a and as a result, a disc accommodation room 18 for accommodating the optical disc 13 is formed in the first half 15 and the inner case 17.

As FIG. 7 to FIGS. 9A–D show, the cave-in portion 15a of the first half 15 is displaced slightly downward in a longitudinal direction (an up to down direction in FIG. 8) and at a central portion thereof is provided an escaping concave portion 15b to which the hub portion of the optical disc 13 is made to correspond. At an inner surface edge on the broad width side of the longitudinal direction of the first half 15, a notch portion 19a which forms one end of a guide groove 19 is formed continuously from one end to another end in a short direction which orthogonally crosses the longitudinal direction. Then, out of four corner portions surrounding the cave-in portion 15a, at one of the corner portions on the broad width side, a concave portion 15c in which a lock spring 20 showing one example of the lock mechanism is accommodated is formed and also, at both corner portions on the narrow width side, concave portions 15d and 15e to aim at reducing weight and the like are formed. Then, in the vicinity of the two concave portions 15d and 15c are formed holes 21a and 22a which are matched with positioning holes 21 and 22 provided in the second half 16 to become bottom portions thereof.

Further, at the inner peripheral edge of the cave-in portion 15a of the first half 15 is formed an arc-shaped inner concave portion 23a in which an inner frame piece of the second half 15 is fit. Then, at both the corner portions on the narrow width side of the outer peripheral edge of the first half 15 are formed L-letter shaped outer concave portions 23b and 23c in which L-letter shaped outer frame pieces of the second half 16 are fit and at one corner portion on the broad width side is formed a linear state outer concave portion 23d in which a linear state outer frame piece of the second half 16 is fit. At the four corner portions of the first half 15 are provided a proper number of screw holes 24 for fastening the first half 15 and second half 16 with screws.

An end portion of the concave portion 15c in the longitudinal direction on the narrow width side of the first half 15 is provided an opening portion 25a which opens toward the notch portion 19a and in the concave portion 15c in the vicinity of the opening portion 25a is projectingly provided a support pin 26. There is provided such an arrangement that the lock spring 20 is supported by the support pin 26 and a part thereof is made capable of advancing to and retreating from the guide groove 19.

The lock spring 20, as is shown in FIG. 5, FIG. 7 and FIGS. 14A and 14B, comprises a lock main body 20a disposed in a V letter shape, an elastic piece 20b, and a sleeve shaft portion 20c provided at a connecting portion of them. The lock main body 20a of the lock spring 20 is comprised of an arm piece with comparatively high stiffness, which is folded to be formed in a V letter shaped and its tip end side is extended nearly in parallel with the elastic piece 20b. On its opposite side surface to the elastic piece 20b is provided a nail-receiving portion 27 for locking the slide shutter 14 by engaging with a nail portion. Also, the elastic piece 20b is imparted with an elasticity by appropriately setting the thickness thereof thin. Then, at a tip end portion of the elastic piece 20b is provided with a semi-sphere shaped fulcrum portion 28 for reducing frictional resistance between the wall of the concave portion 15c and the elastic piece 20b.

The lock spring 20 having such the arrangement, by swingably fitting the support pin 26 in the hole of the sleeve shaft portion 20c, is accommodated in the concave portion 15c while the lock main body 20a is in a state of being made to face the opening portion 25a of the first half 15. At this time, the fulcrum portion 28 of the spring tab 20b is made to come in contact with the inner wall surface of the concave portion 15c and as is shown in FIG. 2, when the lock-spring 20 is in its free state, the tip end portion of the lock main body 20a is made to project within the guide groove 19. At this time, the lock main body 20a comes in contact with a main body receiving portion 29 which is formed by providing a terraced portion 25b contiguous to the opening portion 25a of the first half 15 and as a result, the tip end portion is projected within the guide groove 19 by a predetermined amount.

The inner case 17 fit in the cave-in portion 15a of the first half 15 has an arrangement as shown in FIG. 7 and FIGS. 12A and 12B. That is, the inner case 17 is comprised of a shallow bottomed dish shaped disc and an opening hole 30 is provided on the plane portion thereof. The opening hole 30 of the inner case 17 is made an oblong hole extending in one radius direction from nearly the central portion of the plane portion to reach the vicinity of an outer peripheral edge and its central portion is formed into a circle. Then, inside the plane portion, a crescent moon shaped projected streak portion 17a is provided surrounding the circumference of the central side circular portion. The projected streak portion 17a is one for supporting an inside non-storage area inside in a radius direction of the optical disc 13 where an information signal is not recorded. By supporting the non-storage area of the optical disc 13 by the projected streak portion 17a, an information signal area in which the information signal is recorded can be prevented from coming in contact with an inner surface of the inner case 17.

Further, on the opposite side of the opening hole 30 in the plane portion of the inner case 17 is provided a positioning hole 31 for positioning the inner case 17 to the second half 16. The inner case 17, as is shown in FIG. 3 and FIG. 4, is fit in the concave portion 15a by being inserted from the opening side of the plane and as a result, the disc accommodation room 18 is formed between the first half 15 and the inner case 17. Then, the second half 16 is superposed on the inner case 17.

The second half 16 is, as is shown in FIG. 7, FIG. 10 and FIGS. 11A–D, made of a shape corresponding to the shape of the first half 15 and inside an oblong square plate body is provided an arc-shaped inner convex portion 32a which fits in an inner concave portion 23a of the above-mentioned first half 15, L-letter shaped outer convex portions 32b and 32c which similarly fit in outer concave portions 23b and 23c and a linear shaped outer convex portion 32d. Further, on an inner surface of the two corners of the second half 16 are provided engaging convex portions 33a and 33b which are engaged with both end portions of the notch portion 19a of the first half 15. By matching these convex portions 32a to 32d and 33a, 33b with the concave portions 23a to 23d and the notch portion 19a, the first half 15 and the second half 16 are respectively positioned and superposed.

The second half 16 is provided with an opening window 35 at a position corresponding to the opening hole 30 of the inner case 17. That is, the opening window 35 is made a long hole extending in one radius direction from nearly a central portion of the second half 16 to reach the vicinity of an outer peripheral edge thereof, and the central portion thereof is formed into a circle. The opening window 35 is slightly larger than the opening hole 30, both being made similar in shape, and in order to position the opening hole 30 and the opening window 35 face to face, on an inner surface of the second half 16 is provided a positioning projection 16a. By engaging the projection 16a with the positioning hole 31, as is shown in FIG. 2, FIG. 6 and so on, the inner case 17 is positioned to the second half 16 and the opening window 35 and the opening hole 30 are superposed.

On an inner surface of the second half 16 is provided a shutter space portion 36 which is a clearance capable of slidably accommodating the slide shutter 14 between the first half 15 and the inner case 17. The shutter space portion 36 is, as is shown in FIG. 10 and FIGS. 11A–D, set to form a predetermined clearance in the peripheral edge of the opening window 35 and opened toward the two sides, one side being in a direction along which the opening window 35 of the second half 16 extends and another side being in one of directions which is perpendicular thereto. In the shutter space portion 36, as is shown in FIG. 1 to FIG. 6, the slide shutter 14 showing an concrete example of the shutter member is accommodated, as if sandwiched, between the first half 15 and the second half 16.

The second half 16 is provided with the same number of inserting holes 37 as the screw holes 24 at positions corresponding to the screw holes of the first half 15 for screwing the second half to the first half 15. Then, in both the corner portions on the opposite side to the side to which the opening window 35 of the second half 16 extends are provided positioning holes 21 and 22, and by positioning both the halves 15 and 16 by respectively superposing them, both the positioning holes 21, 22 and positioning holes 21a, 22a are respectively matched to each other.

The slide shutter 14, as shown in FIG. 7 and FIGS. 13A to 13C, comprises a shutter main body 14a for opening and closing the opening window 35 and a slide supporting portion 14b for slidably supporting the shutter main body 14a on the second half 16. Then, the slide supporting portion 14b is provided with a lock nail 38 for locking the slide shutter 14 when the opening window 35 is in a state of being shielded by the shutter main body 14a.

The shutter main body 14a of the slide shutter 14 is formed appropriately larger than the opening window 35 so that a mutually overlapping portion (hereafter, referred to as an overlapping portion) 40 ranging over the whole periphery of the opening window 35 of the second half 16 can be made. Therefore, an overlapping portion 41 (a portion ranging over the whole periphery of the opening portion 30, where the shutter main body 14a and the opening hole 30 of the inner case 17 overlap each other) which is slightly wider in an inner side direction than the overlapping portion 40 is formed between the shutter main body 14a and the inner case 17, too. By providing such double structured overlapping portions 40 and 41, the intrusion into the disc accommodation room 18 of the trash and the like can be prevented by making it difficult for the trash and dust to pass through between the shutter main body 14a and the second half 16 and inner case 17.

Further, the shutter main body 14a of the slide shutter 14 is provided with a pressuring projection 42 as a convex portion which comes in contact with the inner surface of the second half 16. By having the pressuring projection 42 come in contact with the inner surface of the second half 16 to push the shutter main body 14a against the opening hole 30 side, the clearance at the overlapping portion 41 between the shutter main body 14a and the inner case 17 can be made as narrow as possible, thereby making it possible to more effectively prevent the trash and dust from intruding into the disc accommodation room 18. The pressuring projection 42 of the slide shutter 14 may be projectingly provided on the inner case 17 side and in this occasion, the shutter main body 14a is pushed against the opening window 35 side due to the action of the pressuring projection 42 which comes in contact with the inner case 17, thereby making it possible to obtain the same effect.

The slide supporting portion 14b of the slide shutter 14 is formed into an L-letter shape contiguous to one end in the longitudinal direction of the shutter main body 14a. A coming off stopping tab 14c on the tip end side of the slide supporting portion 14b is, as is shown in FIG. 3, engaged with a long groove 43 provided on a rear surface on a broad width side in a longitudinal direction of the first half 15 and as a result, the slide shutter 14 is prevented from coming off. At this time, the lock nail 38 provided contiguous to the slide supporting portion 14b is inserted into the notch portion 19a of the first half 15, and the guide groove 19 is formed by the notch portion 19a and the second half 16. The lock nail 38 is detachably engaged with the nail-receiving portion 27 of the lock spring 20.

Also, as for the optical disc 13 accommodated in the disc accommodation disc 18 of the cartridge housing 12 having the above-mentioned arrangement, for example, a phase change type optical disc can be applied. The phase change type optical disc changes a phase of a film from a crystalline state to an amorphous state by adding heat to a recording film of a GeTeSb system and carries out recording of an information signal by utilizing the difference in the reflection coefficient of light due to a change in phase as well as reproduces the information signal by detecting the same by the optical head. In the central portion of the optical disc 13 is, as shown in FIG. 3 and FIG. 4, provided a hub portion 13a which swells to one surface side, and inside the hole of the hub portion 13a is fit in and fixed a hub plate 45 formed of magnetic material.

By fitting the turntable of the disc recording and reproducing apparatus in the hub 13a and by having a magnet built in the turntable adsorb and fix the hub plate 45, the optical disk 13 is driven into rotation by a spindle motor. On the outside in the radius direction of the hub portion 13a of the optical disk 13 the above-mentioned signal storage area is set and the optical pick-up device of the disc recording and reproducing apparatus is made to face the signal storage area thorough the above-mentioned opening window 35 and the opening hole 30.

As for the materials of the above-mentioned first and second halves 15, 16 and the lock spring 20, for example, an ABS resin (acrylonitrile, butadiene, styrene resin) and other synthetic resin are suitable, but aluminum alloy and other metals can be used. Also, as for the materials of the slide shutter 14 and the inner case 17, metals such as stainless steel and the like are suitable, but the ABS resin and other plastic can be used.

Meanwhile, though not shown graphically, by providing an erroneous erasure protection mechanism in the cartridge housing 12, for example, by having an erroneous erasure protection hole structured to be capable of opening and closing by a manipulating knob, there can be provided an arrangement to select a state where writing to the optical disk 13 is possible and a state where writing thereto is made impossible.

The disc cartridge 11 with such the arrangement is, for example, can be simply assembled in the following way. First of all, after the swelled portion side of the hub 13a of the optical disc 13 is inserted in the concave portion 15a of the first half 15, the opening side of the inner case 17 is fit in the concave portion 15a. At that time, the inner case 17 is fit by aligning the direction in which the opening hole 30 extends with the longitudinal direction of the first half 15.

Next, the lock spring 20 is set in the concave portion 15c of the first half 15. The lock spring 20 has the hole of the sleeve shaft portion fit the support pin 26 of the concave portion 15c as well as the tip end of springy tab 20b come in contact with the inner wall surface of the concave portion 15c, thereby having the tip end portion of the lock main body 20a project within the guide groove 19.

Next, the slide shutter 14 is fit to the first half 15. In this case, the slide supporting portion 14b of the slide shutter 14 is made to face the broad width side in the longitudinal direction of the first half 15, and the coming off stopping piece 14c is made to engage with the long groove 43 as well as the lock nail 38 is made to engage with the guide groove 19 in a way that the shutter main body 14a closes the opening hole 30.

Next, the second half 16 is made to face on the slide shutter 14 and the inner convex portion 32a provided on the inner surface thereof is positioned to the inner concave portion 23a of the first half 15 and the outer convex portions 32b to 32d provided in the peripheral portion thereof are positioned to the outer concave portions 23b to 23d. Consequently, the engaging convex portions 33a and 33b provided in both the corner portions on the broad width side in the longitudinal direction of the second half 16 are simultaneously positioned. Concurrently, as mentioned above, by fitting the inner case 17 in a predetermined posture, the positioning projection 16a provided in the second half 16 is positioned to the positioning hole 31 of the inner case 17.

Then, by pushing the second half 16 against the first half 15 side to superpose both the halves 15 and 16, the cartridge housing 12 is assembled with the slide shutter 14 in a state of being accommodated in the shutter space portion 36 of the second half 16. Thereafter, by inserting securing screws in the inserting holes 37 of the second half 16 to have the tip end thread portions thereof engage with screw holes 24 of the first half 15, both the halves 15 and 16 are integrally united through a plurality of securing screws and the assembly work of the disk cartridge housing 11 is completed.

The disc cartridge 11 manufactured in this manner can be used as a recording medium of a personal computer capable of using a disc-shaped storage medium such as an optical disc and the like, or a digital still camera, a digital video camera and other disc recording and/or reproducing apparatus.

Next, a case where the disc cartridge 11 is used for, for example, the disc recording and/or reproducing apparatus of a personal computer or the like will be explained. The disc cartridge 11 is inserted into the cartridge inserting mouth of the disc recording and/or reproducing apparatus from the left side shown by an arrow mark in FIG. 2.

Consequently, a manipulating pin of a shutter opening and closing mechanism, not shown graphically, provided in the disc recording and/or reproducing apparatus enters in the guide groove 19 of the disc cartridge 11 and a tip end portion thereof comes in contact with the lock main body 20a of the lock spring 20 projecting in the guide groove 19. When the disc cartridge 11 is further inserted, as is shown in FIG. 6, the lock main body 20a is pushed in the opening portion 25a against the spring force of the springy piece 20b of the lock spring 20.

As a result, the lock nail 38 comes off the nail receiving portion 27 of the lock main body 20a, and the locking of the lock nail 38 by the nail receiving portion 27 is released, with the slide shutter 14 becoming a state of being able to move freely. Then, by further inserting the disc cartridge 11, the slide shutter 14, pushed by the manipulating pin, moves to change from a state shown in FIG. 1 and FIG. 2 to a state shown in FIG. 5 and FIG. 5. As a result, the opening hole 30 is opened and the hub portion 13a of the optical disc 13 and part of the information storage area are partially exposed through the opening window 35 and the opening portion 30.

Then, by inserting the turntable through the opening window 35 and the opening portion 30 to be fit to the hub 13a and securely fixed by the magnetic force, the optical disc 13 integrates with the turntable and becomes capable of rotating. Then, by inserting the optical head of the optical pick-up device through the opening window 35 and the opening portion 30 to face the information storage area of the optical disc 13, writing (recording) to and reading out (reproducing of information signals) from the information storage area becomes possible.

An ejecting operation of the disc cartridge 11 can be carried out by reversing to the above-mentioned inserting operation. That is, to take out the disc cartridge 11, when the disc cartridge 11 is moved in the right direction in FIG. 6, the slide shutter 14 is engaged with the manipulating pin and moves in the left direction so as to close the opening hole 30.

Then, the slide shutter 14 moves a predetermined distance and as is shown in FIG. 2, when the opening hole 30 is completely closed, the lock nail 38 jumps over the tip end portion of the lock main body 20a of the lock spring 20 to be engaged with the nail receiving portion 27. As a result, the slide shutter 14 is locked by the lock spring 20 and becomes a state of being completely closed.

In the case, the slide shutter 14 is supported, as if sandwiched between the first half 15 and the second half 16 and as shown in FIG. 3 and FIG. 4, the surfaces of the shutter main body 14a and the slide supporting portion 14b are so arranged to be on the inner side of the surface of the second half 16. For that reason, since a user can not simply touch the surfaces of shutter main body 14a as well as the slide supporting portion 14b, fears that a user accidentally opens the slide shutter 14 can be diminished, thereby making it possible to prevent the intrusion of the trash and dust due to such an erroneous opening operation.

Also, in a state where the opening hole 30 and the opening window 35 are shielded, since there is provided an arrangement such that the overlapping portion 41 is provided between the slide shutter 14 and the opening hole 30 of the inner case 17 and the overlapping portion 40 is provided between the slide shutter 14 and the opening window 35 of the second half 16, these overlapping portions 40 and 41 seal the circumference of the opening portion to restrict to the minimum the entering of the trash and dust into the disc accommodation room 18, thereby making it possible to effectively prevent the trash from intruding.

A disc cartridge 50 shown in FIG. 15 is one in which the lock mechanism of the above-mentioned embodiment is disused. The disc cartridge 50 is not provided with a lock mechanism like a 3.5 inch floppy disc and is so arranged as to always close the opening window 35 by a return spring, not shown graphically, built in the cartridge housing 12. However, there can be an arrangement in which the return spring is not used. An inserting direction of the disc cartridge 50 toward the cartridge inserting mouth is a direction which crosses the moving direction of the slide shutter 14 and that is, is set in the upper part in FIG. 15. However, needless to say, the inserting direction of the disc cartridge 50 can be set in the same direction as the moving direction of the shutter slide 14.

The present invention is not limited to the above-mentioned embodiment. For example, in the above-mentioned embodiment, the example in which the use of the optical disc as the disc-shaped storage medium capable of not only reproducing but also recording has been explained, but it is possible to use not only a reproduction only optical disc but also a magnetic disc, a magneto-optical disc and other disc-shaped storage medium. Further, in the above-mentioned embodiment, an example in which a circular shaped lid body covering the whole of the concave-in portion 15a is used as the shutter supporting body is explained, but it is also possible to use a bridge shaped supporting body which supports only the tip end portion side of the shutter main body 14a of the slide shutter 14. In this case, the above-mentioned overlapping portion becomes only one site formed between the slide shutter 14 and the second half 16.

Also, in the above-mentioned embodiment, an explanation has been made of an example in which the opening window 35 is provided in only the second half 16, but it is possible to provide an opening window at a corresponding position of the first half 15 so that the upper and lower opening windows are simultaneously closed by the slide shutter 14. In this case, a clamper to support a disc-shaped storage media by sandwiching it with a turn table is provided in the disc recording and/or reproducing apparatus side so that at a time of chucking, the clamper enters into the opening window to be made capable of supporting an optical disc by sandwiching it together with the turn table.

Further, as a method of pressing the disc-shaped storage medium to the turn table, an explanation has been made of an example in which a magnet adsorbing system for adsorbing a hub plate to a turn table on the spindle motor side by a magnetic force of a magnet is applied, but various kinds of adsorbing systems such as, for example, a spring adsorbing system which uses a spring, an own weight system by the own weight of an information recording disc and the like can be applied. In this manner, the present invention can be variably changed without departing from the gist of the present invention.

As explained up to now, according to the disc cartridge as stated in the first aspect of the present invention, since there is provided such an arrangement that the shutter member is interposed between a pair of halves and supported, as if sandwiched, by both the halves by making it difficult for the user to touch the shutter member, the erroneous opening and closing apertures by the user can be prevented as well as by making it difficult for the minute trash and dust to intrude, it is possible to obtain an effect in providing the disc cartridge capable of preventing the loss of the information record due to minute trash and dust.

According to the disc cartridge as stated in the second aspect of the present invention, since there is provided an arrangement such that the free end side of the shutter member is supported by the shutter supporting body provided in the half without the opening window, it is possible to prevent the free end side from flexing, as well as preventing an inconvenience that the shutter member comes in contact with the disc-shaped storage medium.

According to the disc cartridge as stated in the third aspect of the present invention, by forming the disc accommodation room sealed by the half without the opening window and the inner case, it is possible to surely prevent the trash and dust from intruding as well as to obtain an effect that the head portion can be brought near the disc-shaped storage medium by the opening hole of the inner case.

According to the disc cartridge as stated in the fourth aspect of the present invention, since there is provided an arrangement that the clearance along the whole periphery of the opening window is shielded by the overlapping portion of the shutter member, it is possible to surely prevent the trash and dust from intruding in the cartridge housing as well as to prevent the trash and the like from attaching the disc cartridge shaped storage medium and the disc-shaped storage medium from being damaged by the trash and the like.

According to the disc cartridge as stated in the fifth aspect of the present invention, since there is provided an arrangement that the shutter member is pushed against the opening window or the opening portion by the convex portion provided in the shutter member, it is possible to obtain effects in making the clearance small for the trash and dust to enter into as well as preventing the trash and the like from attaching the disc cartridge shaped storage medium and the disc-shaped storage medium from being damaged by the trash and the like.

Also, according to the disc cartridge as stated in the sixth aspect of the present invention, since there is provided an arrangement that the shutter member by the lock mechanism is locked at a position where the opening window is shielded, it is possible to obtain an effect in preventing the shutter member from being freely opened as well as preventing the erroneous opening and closing operation.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A disc cartridge comprising:
   a cartridge housing having a first half and a second half,
      said first half being structurally adapted to mate with said second half,
      said first half having a circular-shaped portion extending from a first half surface,
      said second half having a second half opening;
   an inner case having an inner case upper surface, an inner case opening in said upper surface, and an inner case side surface,
      said inner case side surface being in contact with said first half surface and being concentric with said circular-shaped portion,
      said inner case upper surface being adjacent said inner case side surface,
      said inner case opening being in alignment with said second half opening, said inner case opening and said second half opening forming an opening window; and a shutter member being structurally adapted to travel along a guide groove to open and close said opening window.

2. A disc cartridge as claimed in claim 1, wherein said inner case is structurally adapted to mate with said first half.

3. A disc cartridge as claimed in claim 1, wherein said inner case is located between said first half and said second half.

4. A disc cartridge as claimed in claim 1, wherein said inner case has a concave shape.

5. A disc cartridge as claimed in claim 1, wherein said inner case further comprises a positioning hole, said positioning hole being structurally adapted to position said inner case.

6. A disc cartridge as claimed in claim 1, wherein said first half has a concave shape, said concave shape being structurally adapted to receive said inner case.

7. A disc cartridge as claimed in claim 1, wherein said shutter member is located between said second half and said inner case.

8. A disc cartridge as claimed in claim 1, further comprising a lock mechanism, said lock mechanism locking said shutter member at a position at which said opening window is closed.

9. A disc cartridge as claimed in claim 1, wherein said first half has a first half bottom surface and a first half side surface, said first half side surface having a first half notch portion.

10. A disc cartridge as claimed in claim 9, wherein said second half has a second half top surface and a second half side surface, said second half side surface having a second half notch portion.

11. A disc cartridge as claimed in claim 9, wherein said first half notch portion and said second half notch portion form said guide groove.

12. A disc cartridge as claimed in claim 1, wherein said shutter member further comprises a shutter main body, and a shutter slide supporting portion at a distal end of said shutter member, said shutter slide supporting portion engaging said guide groove.

13. A disc cartridge as claimed in claim 12, wherein said shutter main body is larger than said inner case opening.

14. A disc cartridge as claimed in claim 12, wherein said shutter main body being larger than said second half opening.

15. A disc cartridge as claimed in claim 12, wherein said shutter main body includes a pressuring projection thereon, said pressuring projection being in contact with said second half, said pressuring projection being structurally adapted to push said shutter main body against said inner case.

16. A disc cartridge as claimed in claim 1, wherein said first half further comprises a concave portion.

17. A disc cartridge as claimed in claim 16, wherein said inner case is located within said concave portion of said first half.

18. A disc cartridge as claimed in claim 1, further comprising a storage medium, said storage medium being adapted to store an information signal.

19. A disc cartridge as claimed in claim 18, wherein said inner case opening exposes said storage medium.

20. A disc cartridge as claimed in claim 18, wherein said storage medium is a disc-shaped storage medium.

21. A disc cartridge as claimed in claim 18, wherein said storage medium is disposed between said inner case upper surface and said first half surface.

22. A disc cartridge comprising:
a cartridge housing, said cartridge housing having a first half and a second half, said first half being structurally adapted to mate with said second half, said second half having a second half opening;
an inner case, said inner case having a side surface, an upper surface, and an inner case opening in said upper surface, said inner case opening being in alignment with said second half opening, said inner case opening and said second half opening forming an opening window; and
a shutter member, said shutter member being structurally adapted to travel along a guide groove to open and close said opening window,
wherein said shutter member further comprises a shutter main body, and a shutter slide supporting portion at a distal end of said shutter member, said shutter slide supporting portion engaging said guide groove,
wherein said shutter main body includes a pressuring projection thereon, said pressuring projection being in contact with said second half, said pressuring projection being structurally adapted to push said shutter main body against said inner case.

* * * * *